W. C. MOORE.
HARROW.

No. 180,617.

Patented Aug. 1, 1876.

WITNESSES:
E. Wolff.
John Goethals

INVENTOR:
Wm. C. Moore
BY Munn
ATTORNEYS.

UNITED STATES PATENT OFFICE.

WILLIAM C. MOORE, OF CAIRO, PENNSYLVANIA.

IMPROVEMENT IN HARROWS.

Specification forming part of Letters Patent No. 180,617, dated August 1, 1876; application filed July 1, 1876

*To all whom it may concern:*

Figure 1:
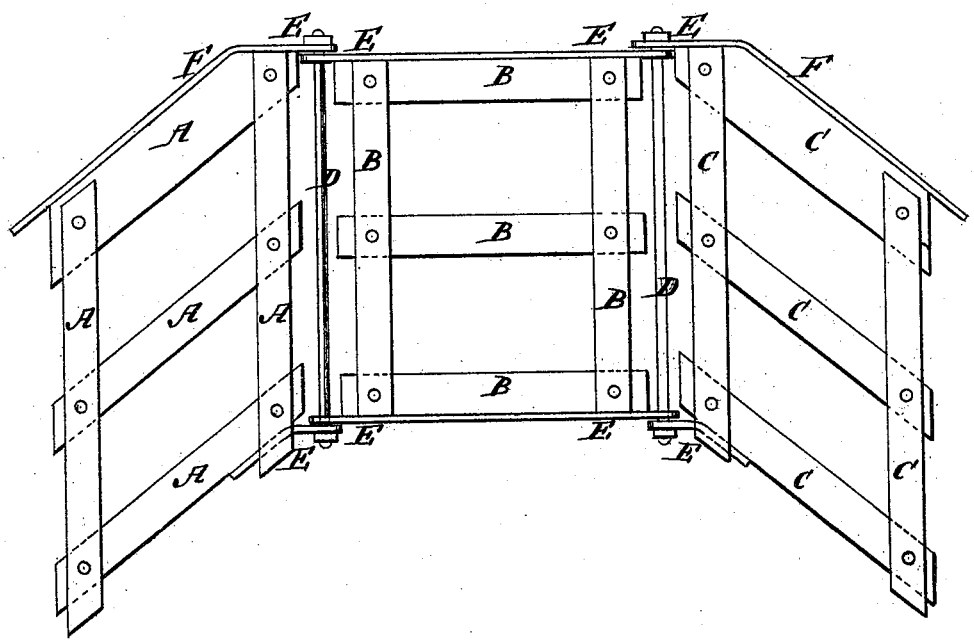
Figure 2:
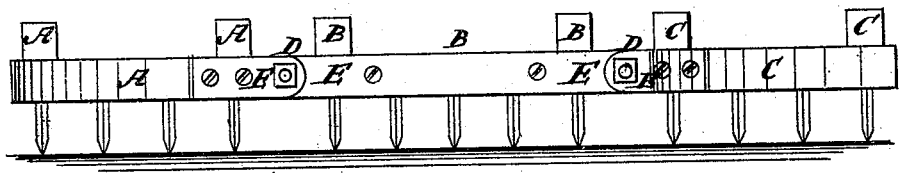

Be it known that I, WILLIAM C. MOORE, of Cairo, in the county of Union and State of Pennsylvania, have invented a new and useful Improvement in Harrows, of which the following is a specification:

Figure 1 is a top view of my improved harrow. Fig. 2 is a rear view of the same.

Similar letters of reference indicate corresponding parts.

The object of this invention is to furnish an improved harrow which shall be so constructed as to harrow the ground evenly, adjust itself to uneven ground, and be conveniently drawn to and from the field, and which shall be simple in construction and convenient in use.

The invention consists in an improved harrow, formed in three sections, hinged to each other by bolts and straps, the middle section being made rectangular, and the side sections oblique, having their forward corners beveled off, and shoes attached to the forward sides of their front cross-bars, as hereinafter fully described.

The harrow is made in three sections, A B C, each of which is formed of three or more cross-bars, to which the teeth are attached, and which are connected together near their ends by longitudinal bars, as shown in Fig. 1. The cross-bars and the longitudinal bars of the central section B cross each other at right angles, and the cross-bars and the longitudinal bars of the side sections or wings cross each other at an oblique angle, the cross-bars of said side sections being inclined to the rearward. The three sections are hinged to each other by long bolts D, which pass through iron straps E, attached to the front and rear cross-bars of said sections. The forward corners of the wings or side sections are beveled off, as shown in Fig. 1, and to the forward sides of the front cross-bars are attached iron or steel bars or plates F, to serve as shoes when the harrow is being drawn to and from the field.

By raising the rear end of the middle section nearly to a perpendicular the side sections may be turned inward at right angles, so that the front cross-bars of the side sections may serve as runners for drawing the harrow to and from the field, the shoes F preventing said cross-bars from being worn.

A handle may be attached to the rear part of the middle section for convenience in raising it; and handles may also be attached to the rear part of the side sections for convenience in adjusting said sections, and also for convenience in raising them to pass obstructions, and to free their teeth from rubbish.

Having thus described my invention, I claim as new and desire to secure by Letters Patent—

An improved harrow, formed in three sections, A B C, hinged to each other by bolts and straps D E, the middle section being made rectangular and the side sections oblique, having their forward corners beveled off, and shoes F attached to the forward sides of their front cross-bars, substantially as herein shown and described.

WILLIAM C. MOORE.

Witnesses:
C. W. PAWLING,
JOHN GALLOWAY.